United States Patent
Masumura

(10) Patent No.: US 10,757,336 B2
(45) Date of Patent: Aug. 25, 2020

(54) IMAGE CAPTURING APPARATUS, IMAGE CAPTURING METHOD, AND STORAGE MEDIUM

(71) Applicant: CANON KABUSHIKI KAISHA, Tokyo (JP)

(72) Inventor: Takahiro Masumura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 15/945,056

(22) Filed: Apr. 4, 2018

(65) Prior Publication Data

US 2018/0302542 A1 Oct. 18, 2018

(30) Foreign Application Priority Data

Apr. 12, 2017 (JP) ................. 2017-079119

(51) Int. Cl.
*H04N 5/235* (2006.01)
*G02F 1/1362* (2006.01)
(Continued)

(52) U.S. Cl.
CPC .......... *H04N 5/2351* (2013.01); *G01S 17/36* (2013.01); *G02F 1/136277* (2013.01);
(Continued)

(58) Field of Classification Search
CPC ...... G01S 11/00–16; G01S 5/16; G01S 5/166; G01S 13/08–48; G01S 13/865;
(Continued)

(56) References Cited

U.S. PATENT DOCUMENTS

| 2012/0127557 A1* | 5/2012 | Masumura | A61B 5/0095 359/291 |
| 2012/0182558 A1* | 7/2012 | Masumura | A61B 5/0073 356/450 |

(Continued)

FOREIGN PATENT DOCUMENTS

| JP | H10073661 A | 3/1998 |
| JP | H11102001 A | 4/1999 |
| JP | 2016053566 A | 4/2016 |

OTHER PUBLICATIONS

Göhler et al. "SWIR laser gated-viewing at Fraunhofer IOSB." Proc. of SPIE. Oct. 16, 2015: 964902-1-964902-24., vol. 9649.

(Continued)

*Primary Examiner* — Paul M Berardesca
(74) *Attorney, Agent, or Firm* — Rossi, Kimms & McDowell LLP

(57) ABSTRACT

An image capturing apparatus includes a spatial light modulator configured to shape a wavefront of light traveling from a light source to an object, an image capturer configured to generate image data by capturing an image of the object, and a controller configured to control the spatial light modulator and to make the image capturer capture the image when object light among the light reaches the image capturer via the object. The controller performs an optimization control of the spatial light modulator so as to maximum or minimize a value of an objective function set by using a luminance value in a target area corresponding to the object light in the image data.

11 Claims, 6 Drawing Sheets

(51) Int. Cl.
  *H04N 5/225* (2006.01)
  *G01S 17/36* (2006.01)
  *H04N 5/232* (2006.01)

(52) U.S. Cl.
  CPC ......... *H04N 5/2256* (2013.01); *H04N 5/2354* (2013.01); *H04N 5/232121* (2018.08); *G02F 2203/11* (2013.01); *G02F 2203/12* (2013.01); *G02F 2203/50* (2013.01)

(58) Field of Classification Search
  CPC ......... G01S 13/867; G01S 13/89–9094; G01S 2013/462–468; G01S 17/08–36; G01S 17/46; G01S 17/48; G01S 17/88–895; H04N 13/254; H04N 5/2256; H04N 5/2354; G01B 7/023; G01B 7/26; G01B 11/026; G01B 11/22; G02F 2203/12
  See application file for complete search history.

(56) References Cited

U.S. PATENT DOCUMENTS

| | | | |
|---|---|---|---|
| 2014/0107944 A1* | 4/2014 | Ben-Amotz | G01N 21/65 702/30 |
| 2014/0268096 A1 | 9/2014 | Lebow et al. | |
| 2015/0323786 A1* | 11/2015 | Kita | G03F 7/70116 430/325 |
| 2016/0338592 A1* | 11/2016 | Masumura | G01N 21/4795 |
| 2017/0118423 A1* | 4/2017 | Zhou | H04N 5/357 |
| 2017/0127025 A1* | 5/2017 | Damberg | G02B 26/06 |
| 2019/0204065 A1* | 7/2019 | Akagawa | G01B 9/02041 |

OTHER PUBLICATIONS

Vellekoop et al. "Scattered light fluorescence microscopy: imaging through turbid layers." Optics Letters. Apr. 15, 2010: 1245-1247. vol. 35, No. 8.

Vellekoop et al. "Phase control algorithms for focusing light through turbid media." Optics Communications. 2008: 3071-3080. vol. 281.

Conkey et al. "Genetic algorithm optimization for focusing through turbid media in noisy environments." Optics Express. Feb. 13, 2012: 4840-4849. vol. 20, No. 5.

Caravaca-Aguirre et al. "Real-time resilient focusing through a bending multimode fiber." Optics Express. May 17, 2013: 12881-12887. vol. 21, No. 10.

* cited by examiner

IMAGE CAPTURING APPARATUS, IMAGE CAPTURING METHOD, AND STORAGE MEDIUM

BACKGROUND OF THE INVENTION

Field of the Invention

The present invention relates to an image capturing or imaging technology.

Description of the Related Art

A known image capturing apparatus can reduce a distortion component in an object image and capture an image by reducing light scattering influences caused by nanoparticles, such as fogs and smokes, in the atmosphere, fluctuations of a refractive index in a space in the atmosphere, etc. Japanese Patent Laid-Open No. 11-102001 and Benjamin Gohler and Peter Lutzmann, "SWIR laser gated-viewing at Fraunhofer IOSB," Proc. of SPIE Vol. 9649 964902 (2015) disclose a gated active imaging apparatus ("GAI") as an image capturing apparatus that irradiates light on an object and captures an image when the light is reflected on and returns from the object. Since a returning time to the image capturing apparatus for light scattered on a scatterer, such as the fog, and that for light reflected on the object are different from each other, an image can be captured with a reduced distortion component caused by the scattered light by properly controlling a delay time to image capturing after the light is emitted.

However, a high nanoparticle concentration in the atmosphere and a large light scattering amount weaken the light (signal light) reflected on the object and causes a larger amount of incident scattered light in the same delay time as that for the reflected light, thus deteriorating a signal to noise (SN) ratio in the captured image. As a solution for this problem, U.S. Patent Application Publication No. 2014/0268096 discloses a method for calculating a reflected light wavefront based on a measured hologram obtained through an interference between the reflected light from the object and reference light, for generating a phase conjugate wave at a spatial light modulator, and for irradiating the phase conjugate wave onto an object through the scatterer by utilizing the time reversal characteristic of the phase conjugate wave. I. M. Vellekoop and C. M. Aegerter, "Scattered light fluorescence microscopy: imaging through turbid layers", Optics Letters Vol. 35, No. 8 (2010) discloses a method in a fluorescent microscope that shapes a wavefront of light incident on a scatterer through an optimization process via a spatial light modulator, irradiates light on a fluorescent sample through the scatterer, and provides effects similar to those when the phase conjugate wave is used.

However, the method disclosed in U.S. Patent Application Publication No. 2014/0268096 needs a complicated optical system so as to measure the hologram by using reference light, and is vulnerable to noises, such as vibrations.

The method disclosed in I. M. Vellekoop and C. M. Aegerter, "Scattered light fluorescence microscopy: imaging through turbid layers", Optics Letters Vol. 35, No. 8 (2010) can use, as an optimization target (objective function) for the optimization process, a fluorescent intensity that can be easily and clearly distinguished from the scattered light. However, an attempt to apply this method to the GAI apparatus has difficulties in setting the objective function, since there is no light to be clearly distinguished from the scattered light like the fluorescent light.

SUMMARY OF THE INVENTION

The present invention provides an image capturing apparatus etc. which can capture an object image with a high SN and a simple structure even with strong scatters.

An image capturing apparatus according to one aspect of the present invention includes a spatial light modulator configured to shape a wavefront of light traveling from a light source to an object, an image capturer configured to generate image data by capturing an image of the object, and a controller configured to control the spatial light modulator and to make the image capturer capture the image when object light among the light reaches the image capturer via the object. The controller performs an optimization control of the spatial light modulator so as to maximum or minimize a value of an objective function set by using a luminance value in a target area corresponding to the object light in the image data.

Further features of the present invention will become apparent from the following description of exemplary embodiments with reference to the attached drawings.

DESCRIPTION OF THE EMBODIMENTS

A description will be given of embodiments of the present invention with reference to the accompanying drawings.

First Embodiment

Figure 1:
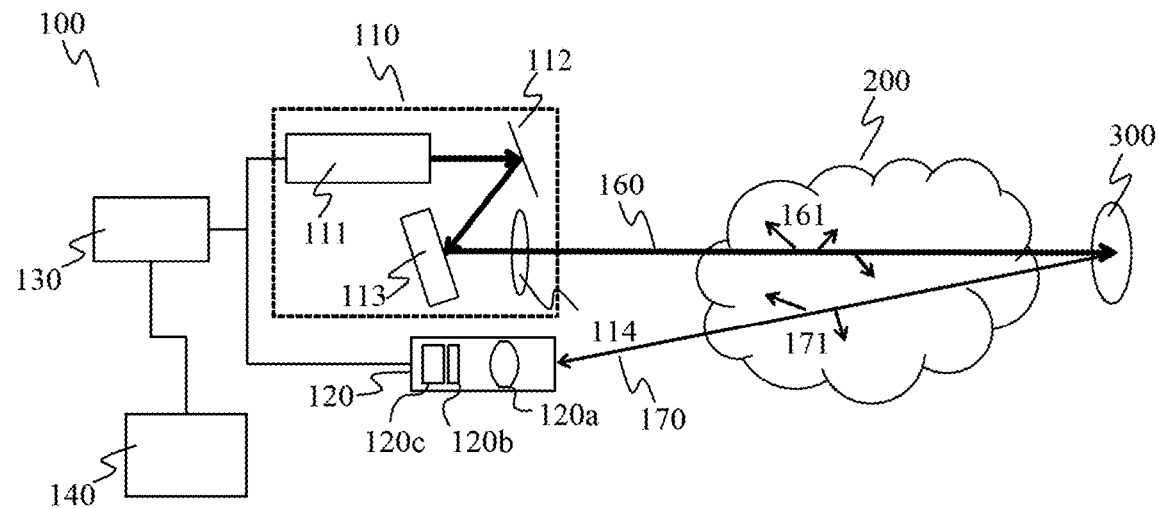
FIG. 1 illustrates a configuration of a gated imaging apparatus according to a first embodiment of the present invention.

FIG. 1 illustrates a configuration of a gated imaging apparatus as an image capturing apparatus according to a first embodiment of the present invention. The gated imaging apparatus 100 includes a light source unit 110, a camera unit 120, a controller and processor (simply referred to as a "controller" hereinafter) 130, and a display unit 140. The camera unit 120 corresponds to an image capturer, and the controller and processor 130 corresponds to a controller.

The gated imaging apparatus 100 captures an image of an object 300 through a scatterer 200 in the atmosphere. The scatterer 200 contains nanoparticles in the atmosphere, such as a fog, mist, smoke, smog, and dust and powder having a micrometer size. The scatterer 200 can also contain fluctuations of a refractive index caused by an uneven temperature distribution of snow, rain and atmosphere, etc.

The light source unit 110 mainly includes a laser light source 111 and a spatial light modulator ("SLM") 113. The laser light source 111 emits a short wavelength infrared ("SWIR") pulsed light beam (simply referred to as "pulsed light" hereinafter) having a wavelength of 1.4 to 1.8 μm, generally referred to as an eye-safe laser beam. In this embodiment, the pulsed light has a wavelength of 1.5 μm, and a pulse width of 1 to dozens of nanoseconds. Depending on the imaging condition, another wavelength band and another pulsed width may be used. The pulse repetitive frequency is arbitrarily selected, for example, in a range of several Hz to several hundred kHz.

The pulsed light collimated and emitted from the laser light source 111 is reflected on the mirror 112 and enters the SLM 113. A beam size of the pulsed light is set within an effective modulation region of the SLM 113 as an entire phase-modulation available pixel region. The SLM 113 can use a liquid crystal on silicon ("LCOS") and a digital mirror device ("DMD"). The SLM 113 can use a transmission type liquid crystal device. When the SLM 113 is a polarization dependent device, the polarization direction of light entering the SLM 113 is adjusted to the phase-modulation polarization direction in the SLM 113.

The SLM 113 modulates a phase of the pulsed light entering each pixel or each segment area, which will be described later, through an optimization control (optimization process), which will be described later. The pulsed light 160 phase-modulated and reflected in the SLM 113 passes the optical system 114 so as to adjust its beam size and the illumination direction, and is emitted from the light source unit 110. In this case, if necessary, a Galvano mirror may scan the pulsed light 160. An output intensity of the pulsed light 160 is properly adjusted according to the condition such as an object (whether it is a living thing, such as a human, or a nonliving thing) and a distance to the object. For example, the output intensity is adjusted in a range from several tens mJ to several hundreds mJ.

While the pulsed light 160 emitted from the light source unit 110 passes the scatterer 200 in the atmosphere, part of it becomes scattered light 161 and the remaining light propagates to the object 300. Moreover, while the pulsed light reflected on the object 300 again passes the scatterer 200, part of it becomes scattered light 171 and the remaining light returns to the camera unit 120. The object 300 is far from the camera unit 120, for example, by 100 m to dozens of kilometers. This embodiment assumes that the pulsed light 160 irradiated on the object 160 is the light in the above SWIR band. This is because this light can restrain scatters in comparison with the visible light, and even when the object 300 is a human, the light can be safely irradiated with an intensity higher than that of the visible light.

The camera unit 120 includes a camera lens (image capturing optical system) 120a that sufficiently transmits light with a wavelength of 1.5 μm, an array sensor 120b that is sensitive to this wavelength, and an image generator 120c.

The camera lens 120a forms an image of the pulsed light from the object 300 (which is reflected object light). A focal length of the camera lens 120a is properly selected according to a distance to the object 300. When the object 300 is distant, a telephoto lens having a focal length of 1000 mm or longer, for example, is used. An array sensor 120b includes an image sensor using InGaAs that is sensitive to the SWIR, and photoelectrically converts (captures) the object image formed by the camera lens 120a. The shutter time (gate time) in the array sensor 120b is selected within a range from dozens of nanoseconds to several microseconds, for example. The image generator 120c generates a captured image (image data) based on the image signal output from the array sensor 120b that has photoelectrically converts the object image.

The image data generated by the camera unit 120 is transmitted to the controller 130. The controller 130 performs a measurement process, which will be described later, and controls the light source unit 110 and the camera unit 120. The controller 130 performs the optimization control for the SLM 113 so as to optimize the wavefront of the pulsed light 160 irradiated toward the object 300 from the light source unit 110 in the wavefront shaping process, which will be described later. The display unit 140 displays a captured image. The display unit 140 may display image data generated in the image capturing in the measurement process and a status of the wavefront shaping process.

Figure 2:
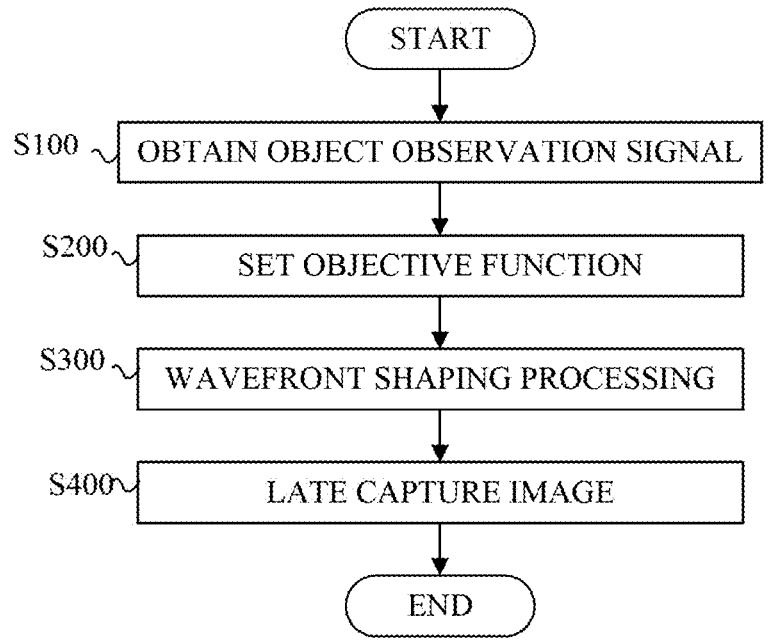
FIG. 2 is a flowchart of a measurement process according to the first embodiment.

A flowchart in FIG. 2 illustrates a flow of the measurement process (gated imaging method) as a control process. The controller 130 executes this process in accordance with the gated imaging program as a computer program. In the following description, S stands for the step.

Initially, in S100, the controller 130 irradiates on the object 300 the pulsed light 160 from the light source unit 110, and makes the camera unit 120 capture (referred to as "late capture" hereinafter) an image the following delay time τ after the irradiation time. The delay time τ is time (sec) from when the light source unit 110 starts irradiating the pulsed light 160 to when the reflected light reflected on the object 300 reaches the camera unit 120 (array sensor 120b). Where c is the light speed in the atmosphere, the camera unit 120 can capture an image of the reflected light from the object 300 distant from the gating imaging apparatus 100 at a distance (image capturing distance) of L=τc/2[m].

When there is no object 300 to be captured at the image capturing distance L, a significant image signal related to the object 300 cannot be obtained. For example, where there is no object in the atmosphere at the image capturing distance L that reflects the pulsed light other than the scatterer 200, a captured image contains only flares caused by scatters. Where there is an object other than the object 300 at the image capturing distance L, the object is captured. Thus, in S100, the controller 130 sets the delay time τ corresponding to the image capturing distance L and makes the camera unit 120 late capture an image when the image capturing distance L to the object 300 is known. In this case, where there is a new delay time that provides the highest signal intensity (luminance value) or the highest contrast (luminance value difference) in the object image or the image signal corresponding to the part of the object image, the controller 130 may change the set delay time τ to the new delay time. In other words, the delay time τ may be adjusted based on the luminance value obtained by the previous image capturing. Where the object 300 is not previously clear, the delay time τ may be gradually changed and the camera unit 120 may late capture an image. Once the significant signal is confirmed in the plurality of obtained captured images, the signal may be set to the image signal corresponding to the object 300 and the subsequent process may be executed.

This embodiment needs to initially obtain the image signal corresponding to the object image (object light) by imaging the reflected light from the object 300 in S100. The image signal corresponding to the object image (referred to as an "object observation signal" hereinafter) may correspond to the entire or part of the object image distorted by scatters in the atmosphere and the fluctuations of the refractive index.

Figure 3A:
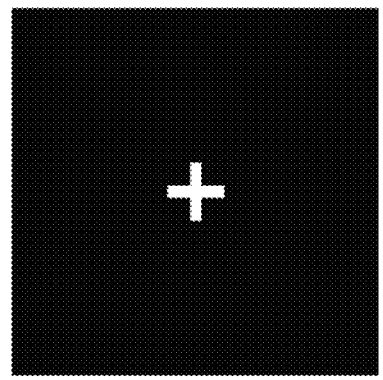
FIG. 3A illustrates an object according to the first embodiment.
Figure 3B:
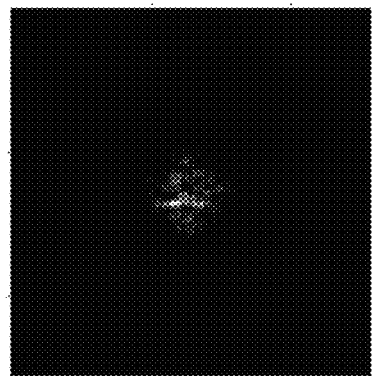
FIG. 3B illustrates the gated imaging apparatus before a wavefront is shaped according to the first embodiment.

FIGS. 3A and 3B illustrate a captured image obtained as a result of simulating the measurement process according to this embodiment. FIG. 3A illustrates a captured image of an ideal object image having no aberration (deterioration by scatters). FIG. 3B illustrates a captured image of the object image distorted by scatters.

The condition for determining the area of the object observation signal based on the captured image is set such that a luminance value in the area is equal to or higher than a predetermined determining threshold (predetermined value) or a characteristic shape of the object image can be confirmed, etc. The characteristic shape may be extracted by an edge process or a filtering process to the captured image. Alternatively, an object image, such as an artificial object and a human, captured under a variety of scattering conditions may be studied and an area of the object observation signal can be determined based on the characteristic amount for reference.

Next, in S200, the controller 130 sets the objective function as a target for the optimization control in the wavefront shaping process in S300. In S100, the object observation signal is obtained and the objective function is set by utilizing the object observation signal.

Figure 3C:
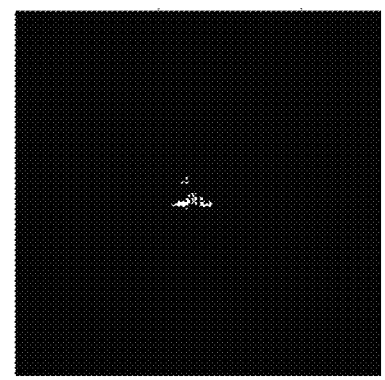
FIG. 3C illustrates a binarized target area according to the first embodiment.

More specifically, initially a binarization process is performed by setting a predetermined binarization threshold to the area of the object observation signal (FIG. 3B) in the captured image obtained in S100, and the entire area extracted from the result is set to the target area as illustrated in FIG. 3C. The binarization threshold may be determined based on a histogram of a luminance value in the captured image. The binarization threshold may be set as large as possible so as to prevent an excessive reduction of the target area. This configuration can remove the noise component, such as a scattered light component, associated with the object observation signal and obtained by the binarization process.

An average value or sum of luminance values in the object observation signals (pixels) in this target area is set to an objective function. Alternatively, a sum of luminance values in the partial area larger than one arbitrary pixel in the target area may be set to the objective function. The partial area may be set to an arbitrary area addressed by a photographer.

Even when the target area is divided into a plurality of sub areas, the objective function may be set as described above. Alternatively, as described later, the wavefront shaping process in S300 may be performed by setting the objective function for each target area independently. Moreover, the object function may use a contrast value of an image calculated based on the luminance value in the target area and the luminance value of the non-target area around (near) the target area in the captured image. Thus, S200 obtains the signal (average value, sum or contrast value of the luminance values) used to set the objective function in the optimization control based on the object observation signal obtained by the image capturing (measurement) in S100.

In shaping the wavefront in the optimization process based on the captured image as in this embodiment, the position or area used to set the objective function needs to be clearly determined. This objective function may be arbitrarily set by the photographer based on the result in S100, or automatically by the controller 130. In other words, the objective function may be set (prepared) based on the result in S100. Where there is advance information on the object 300, the target area and the object function may be set based on the advance information.

Next, in S300, the controller 130 may perform the optimization control for the SLM 113 so as to maximize the value of the objective function set in S200 and so that the wavefront of the pulsed light 160 from the light source unit 110 to the object 300 approaches to the optimal wavefront as an optimal solution. This optimization control (optimization process) initially irradiates the pulsed light 160 having an arbitrarily shaped wavefront (such as a plane wave) from the light source unit 110 to the object 300 and makes the camera unit 120 capture an image a delay time $\tau$ later, and evaluates the value of the object function. The controller 130 iterates the wavefront shaping, the pulsed light irradiation, the late image capturing, and the evaluation of the value of the objective function, and improves or maximizes the objective function value, thereby optimizing the wavefront. The iteration is repeated up to the preset number of iterations or the predetermined value of the objective function.

Figure 3D:
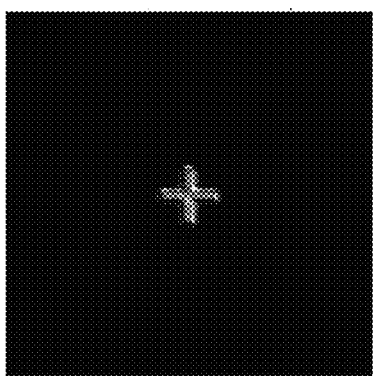
FIG. 3D illustrates a GAI apparatus after the wavefront is shaped according to the first embodiment.

Next, in S400, the controller 130 makes the light source unit 110 irradiate the pulsed light 160 having the optimized wavefront in S300 onto the object 300, and makes the camera unit 120 capture an image a delay time $\tau$ later so as to obtain a final captured image illustrated in FIG. 3D. The process in S300 enables the pulsed light 160 to be effectively irradiated onto the object 300, and consequently the camera unit 120 to capture an image of the object 300 with a high SN through the scatterer 200.

Figure 4:
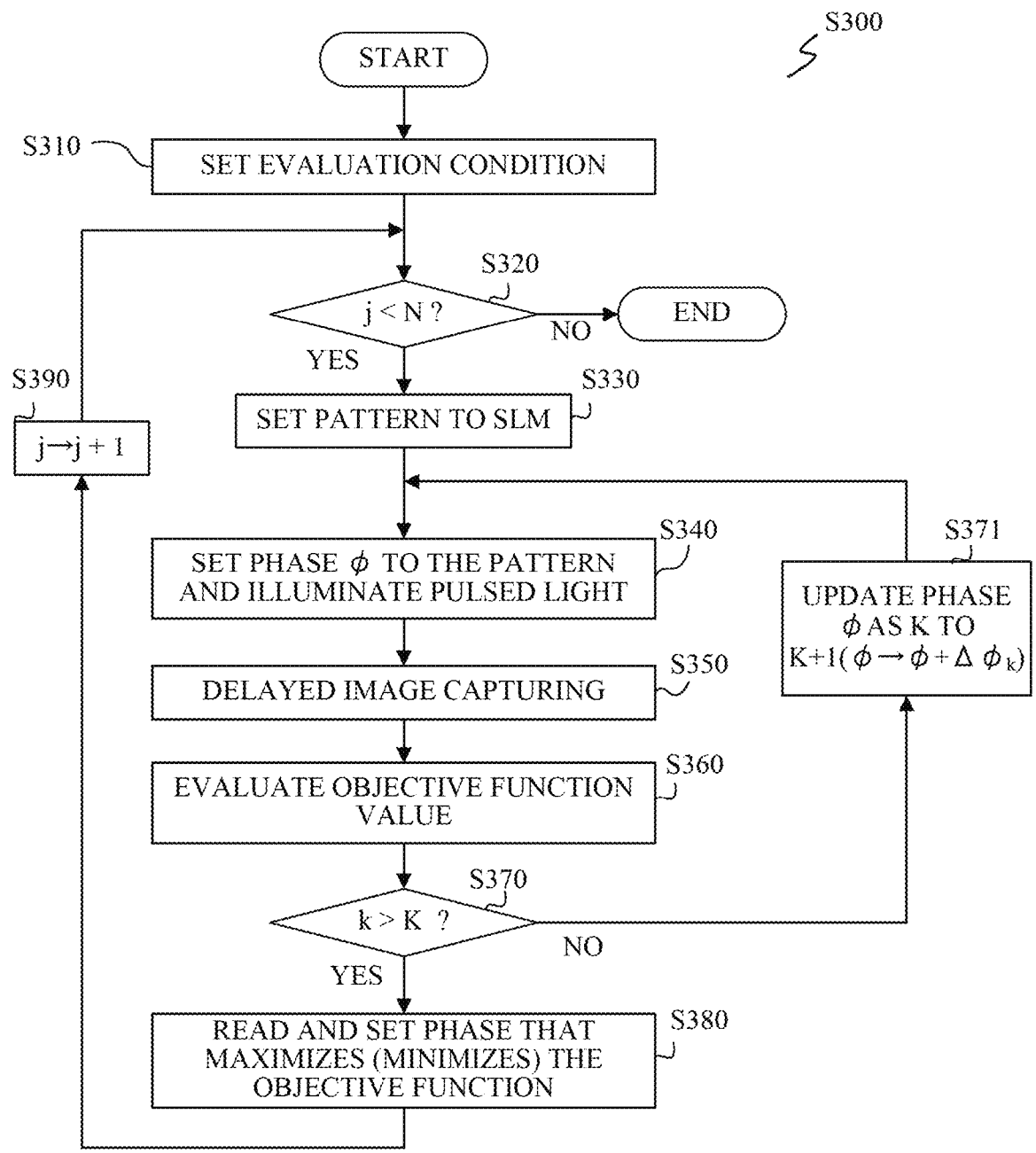
FIG. 4 is a flowchart of a wavefront shaping process according to the first embodiment.

Referring now to FIG. 4, a concrete description will be given of the optimization process in S300. In S310, the controller 130 initially sets an evaluation condition. As the evaluation condition, the controller 130 selects an optimization algorithm, sets the number of iterations N and another optimization convergent condition, sets a basis pattern for the phase modulation, and sets a step size (update amount) AO and the number of steps (the number of updates) K in the phase modulation. Moreover, as the evaluation condition, the controller 130 sets the number of captured images P, when evaluating the value of the objective function based on the average value of the luminance values of a plurality of captured images.

The optimization algorithm can use a stepwise sequential algorithm and a partitioning algorithm disclosed in I. M. Vellekoop, A. P. Mosk, "Phase control algorithms for focusing light through turbid media," Optics Communications, 281 (2008) 3071-3080. A genetic algorithm disclosed in D. B. Conkey et al., "Genetic algorithm optimization for focusing through turbid media in noisy environments," Optics Express, Vol. 20, No. 5, 4840-4849 (2012) may also be used.

For the number of iterations N, N may be directly set or a target value of the objective function is set and the iteration may continue until the value of the objective function reaches the target value. When the sequential method is used for the optimization algorithm, the area may be divided into a plurality of segment areas 411 (j=1, 2, 3, . . . , N) illustrated in black in the effective modulation area in the SLM 113 in FIG. 5A. In this case, the wavefront shaping process controls the SLM 113 while sequentially changing the segment area (phase modulation area) 411 to be phase-modulated and the non-phase modulation area 410 not to be phase-modulated so that each segment area 411 receives independently and uniformly the phase modulation. The segment area 411 is sequentially changed in the entire effective modulation area. Hence, the number of changed segment areas 411 is the number of iteration N. The size of the segment area 411 can be arbitrarily set and the minimum size is the pixel size of the SLM 113.

Figure 5A:
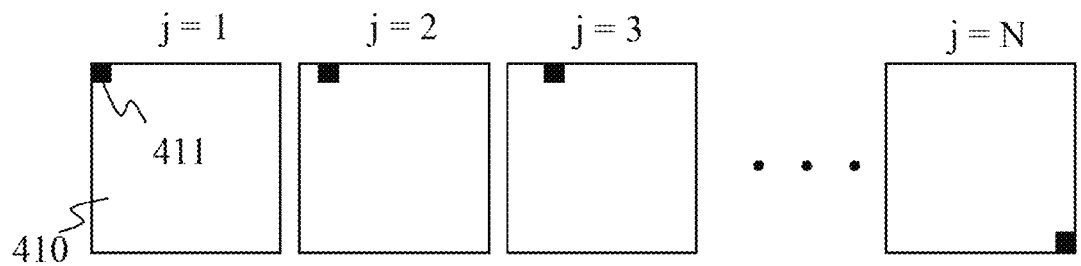
FIG. 5A illustrates a pattern using a segment as a basis pattern according to the first embodiment.
Figure 5B:
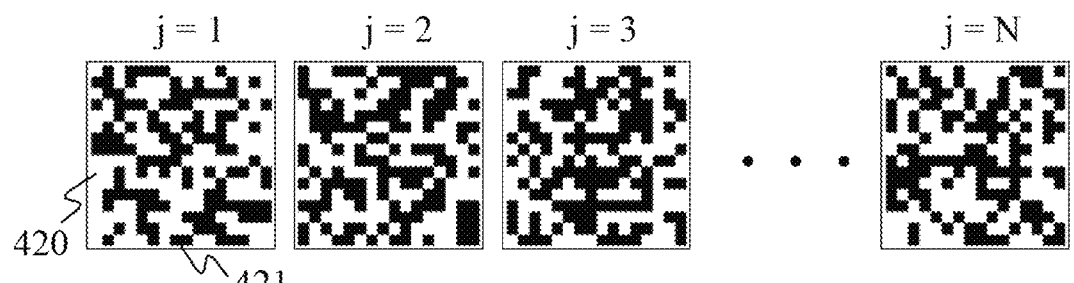
FIG. 5B illustrates a random pattern as the basis pattern according to the first embodiment.
Figure 5C:
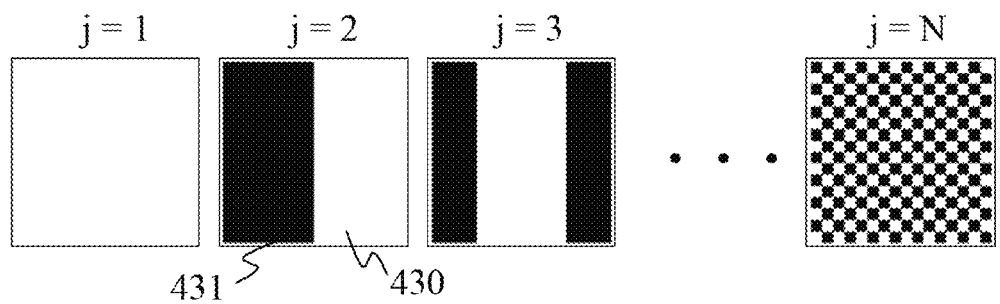
FIG. 5C is an Hadamard basis as the basis pattern according to the first embodiment.

When the partitioning method is used for the optimization algorithm, the phase modulation is performed by sequentially changing the random basis pattern illustrated in FIG. 5B or the basis pattern for the Hadamard basis illustrated in FIG. 5C. These basis patterns (phase modulation patterns) set phase modulation areas 421 and 431 illustrated in black and non-phase modulation areas 420 and 430 illustrated in white to the effective modulation area in the SLM 113. The SLM 113 modulates only the phase of light entering the phase modulation area pursuant to each basis pattern. The number of changed basis patterns is set to the number of iterations N.

The basis pattern may be calculated and generated in S310, or information previously generated and stored in the memory in the controller 130 may be read and used. The number of iterations N may be set in accordance with apparatus side settings, such as a measurement time, and at request of a photographer.

The step size $\Delta\Phi$ in the phase is made by dividing the phase from 0 to $2\pi$ into M, and by setting $\Delta\Phi=2\pi/M$. The phase in the phase modulation is incremented for each $\Delta\Phi$ the number of steps K. Thus, when the phase is modulated from 0, the phase is modulated up to $2\pi K/M$. In addition, averaging the captured image is effective when the value of the objective function is strongly subject to the noises.

A description will be given of the wavefront shaping process on or after S320 when the sequential method is used for the optimization algorithm.

In S320, the controller 130 determines whether the actual number of iterations j reaches the number of iterations N set in S310. The controller 130 ends this process when j≥N, and moves to S330 when j<N. In S330, the controller 130 sets the j-th segment area for the phase modulation to the SLM 113.

Next, in S340, the controller makes the SLM 113 perform the phase modulation for the segment area j. Now assume that the phase $\Phi(x, y)$ of the segment area j is set as $\Phi_k(x, y)=\Phi_{k-1}(x, y)+\Delta\Phi_k$. Herein, (x, y) is a coordinate of the pixel in the SLM 113, and $\Phi_k(x, y)$ is a phase after the k-th process. $\Delta\Phi_k$ is a step size of the k-th phase, and $\Delta\Phi_k=k\times\Delta\Phi$ (k=1 to K). The controller 130 makes the laser light source 111 emit the pulsed light after updating the phase of the segment area j. Thereby, the pulsed light 160 phase-modulated by the SLM 113 is emitted from the light source 110 to the object 300. Assume that the pulsed light 160 is irradiated at t1 from the light source unit 110.

Next, in S350, the controller 130 makes the camera unit 120 late capture an image at time t2 that is a delay time τ when the object observation signal is obtained in S100 passes after t1. This configuration captures the object image formed by the reflected light from the object 300. The controller 130 provides the pulse light irradiations and late captures the number of captured images P set so as to evaluate the value of the objective function by using an average value of the luminance values of a plurality of captured images.

Next, in S360, the controller 130 evaluates the value of the objective function set in S200 by using the captured image generated by the camera unit 120. The evaluated value of the objective function is stored in the memory in the controller 130 with the value of the phase $\Phi(x, y)$.

Next, in S370, the controller 130 determines whether the actual phase step number k exceeds the set step number K. The controller 130 moves to S371 when k<K, and updates the phase $\Phi(x, y)$ in the segment area j by incrementing k (k→k+1). The controller 130 again performs S340 to S360 for the updated phase. This configuration provides the pulse light radiations from the laser light source 111, phase modulations by the SLM 113, late captures by the camera unit 120, and evaluations of the value of the objective function the number of steps K.

In S370, k≥K or when processes are completed the number of steps K, the controller 130 moves to S380. In S380, the controller 130 reads the phase that maximizes the value of the objective function from the evaluation result of the value of the objective function stored in the memory, and sets it to the phase in the segment area j. The processes from S320 to S380 are performed for one segment area.

In S390, the controller 130 similarly iterates the processes from S320 to S380 for the next segment area, and optimizes the wavefront of the pulsed light 160 so as to improve the value of the objective function. This optimization process increases the intensity of the image signal (object observation signal) corresponding to the object image in the captured image, and consequently provides a captured image having a higher SN than that without the wavefront shaping process. The wavefront shaping process illustrated in FIG. 4 is merely illustrative, and a different wavefront shaping process may be performed in accordance with the optimization algorithm to be employed.

When the SLM 113 uses a DMD, the pulsed light 160 can be modulated through the amplitude modulation rather than the phase modulation. For example, the binary amplitude modulation may be made by turning on a pixel that improves or increases the value of the objective function and by turning off a pixel that lowers or decreases the value of the objective function in the pixels in the DMD. As disclosed in A. M. Caravaca-Aguirre, et al., "Real-time resilient focusing through a bending multimode fiber," Optics Express, Vol. 21, No. 10, 12881-12887 (2013), the phase modulation can be used for the binary amplitude modulation DMD. Since a faster response is suitable for the SLM 113, the DMD having a response speed higher than the LCOS may be used.

When the value of the objective function caused by the phase modulation changes slightly or when the noise influence is significant, it is effective to use the partitioning method or the genetic algorithm for the optimization process. Alternatively, the optimization process may be performed for a large segment area by using the sequential method, and then for a small segment area after the value of the objective function improves.

For example, the size of the segment area 411 illustrated in FIG. 5A is set to be large, and the controller 130 executes the optimization process for the SLM 113 so as to maximum the objective function. After the first optimization process (first control) ends, the size of the segment area 411 is set smaller and the second optimization process (second control) follows. At this time, the phase distribution obtained as a result of the first optimization process is used as an initial value in the second optimization process. Thus, the optimization process (optimization control) may be adjusted based on the influence of the noise component.

The wavefront shaping process provide a larger wavefront shaping effect as the number of iterations N increases when scattering is strong, and the value of the objective function improves. As the number of iterations N improves, a longer measurement time is required. When scatters change in this long measurement time, the wavefront shaping effect reduces. On the other hand, when scattering is weak, even when the number of iterations N is small, the wavefront shaping is more effective than that when scattering is strong. Hence, the number of iterations N may be set based on the balance between the wavefront shaping effect and the measurement time period. When the object image is less distorted (when the scattering is small) in obtaining the object observation signal in S100, the processes with the small number of iterations N may be performed by using the basis pattern having a low spatial frequency or a large segment area size. The influence of the scattered light may be estimated by estimating a flare amount in the non-target area in acquiring the object observation signal in S100.

In shortening the measurement time, the processing time in S340 to S370 may be made shorter in addition to reducing the number of iterations N. This configuration may shorten a time period necessary for each of the phase modulation from the pulsed light radiation, the pulsed light irradiation, and the late capturing. Thus, the repetitive frequency of the pulsed light source 111, the refresh rate of the SLM 113, and the image capturing frame rate in the camera unit 120 may be high. For example, the image capturing frame rate may be improved by restraining the number of pixels used to capture an image. Thus, the wavefront shaping process S300 (or S100 to S300) can accelerate the image capturing frame rate by restraining the number of image capturing pixels in the camera unit 120 (array sensor 120b) through binning. Moreover, the image capturing frame rate may be accelerated by setting the target area in the captured image to a region of interest (ROI), by capturing only the ROI, and by restraining the number of captured pixels. After the wavefront shaping process, S400 may late captures an image with the usual number of pixels without binning.

Alternatively, the above evaluation condition may be determined based on the image capturing distance L to the object 300 and the weather condition, such as the wind speed and the temperature around the gating imaging apparatus 100 and the object 300.

Thus, this embodiment specifies a target area as an area from which the object observation signal is obtained, based on the captured image obtained from the late capture. The objective function is set based on the luminance value of the target area, and the optimization process (the optimization control of the SLM 113) shapes the wavefront of the pulsed light 160 emitted from the light source unit 110 so as to make it close to the optimal wavefront that maximize the objective function.

Figure 6:
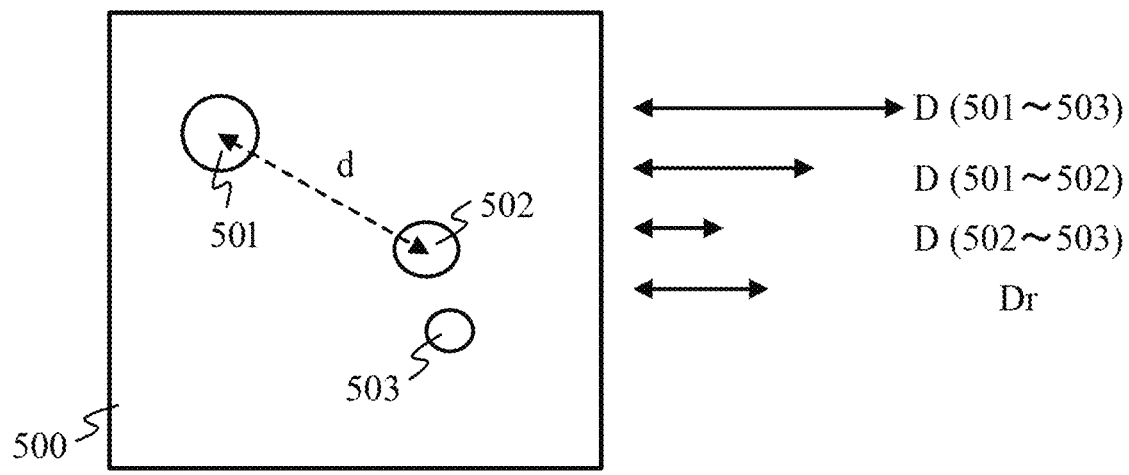
FIG. 6 illustrates a plurality of target areas according to the first embodiment.

Next, a description will be given of the wavefront shaping process by dividing the target area into a plurality of sub areas and extracting the divided area through the binarization process and by setting each target area by independently setting the objective function in S200. FIG. 6 schematically illustrates target areas 501, 502, and 503 extracted by the binarization process to the captured image 500 in S100. Thus, where there are three target areas 501, 502, and 503, as described above, one target area may be set for all of these three target areas, and a sum of luminance values of the target areas 501, 502, and 503 can be set to the objective function.

On the other hand, there are two methods in handling the target areas 501, 502, and 503 separately. The first method is to simply set independent objective functions for the target areas 501, 502, and 503. A sum of the luminance values in the target area 501 is set to the objective function and the processes from S200 to S400 are performed. Similarly, the processes from S200 to S400 are performed for the target areas 502 and 503. In S400, a plurality of obtained captured images are combined in a partial superimposition manner, if necessary, into finally one captured image.

The second method classifies the target areas 501, 502, and 503 based on the predetermined rule, and sets the objective function for each group. For example, as illustrated in FIG. 6, the distance between two approximate center positions (or center positions of gravity) among the target areas 501, 502, and 503 is calculated as a distance d among the target areas. The calculated distance d is compared with a predetermined reference distance dr, and when the calculated distance d is longer than the reference distance dr, the two target areas distant by the distance d are treated as independent target areas and the objective function is set for each target area. The calculated distance d is equal to or shorter than the reference distance dr, the two target areas distant by the distance d are treated as one target area, and one objective function is set.

FIG. 6 treats the target area 501 as a target area independent of the other target areas 502 and 503 and sets an independent objective function for the target area 501. The target areas 502 and 503 are treated as one target area, to which one common objective function is set. The objective functions for the target areas 502 and 503 may be an addition of the luminance values of the target areas 502 and 503. The reference distance dr may be calculated based on an angle θ (isoplanatic angle) with which the wavefront fluctuating shapes in the atmosphere calculated by the following expression (1), for example, are considered to have the same shapes.

$$\theta = (1.09k^2 C_n^2 L^{8/3})^{-3/5} \quad (1)$$

Herein, k is a wave number, $C_n^2$ is a structure constant of a refractive index in an atmosphere, and L is an optical path length. The reference distance $d_r$ can be calculated as follows.

$$dr = L \tan \theta \quad (2)$$

Herein, dr is converted into a distance on the image capturing plane on the array sensor 120b based on the magnification of the camera lens 120a in the camera unit 120. It is necessary to separately measure the structure constant $C_n^2$ or to calculate it based on certain advance information or the premise. Alternatively, the reference distance dr may be determined based on the correlation length by calculating the correlation length of the scattered wavefront based on a plurality of captured images obtained by a plurality of image captures before the process in S100. When the objective function does not sufficiently improve even when a plurality of target areas are integrated into one target area and the wavefront shaping process is performed, the wavefront shaping process may be performed for each of the target areas independently.

Figure 7:
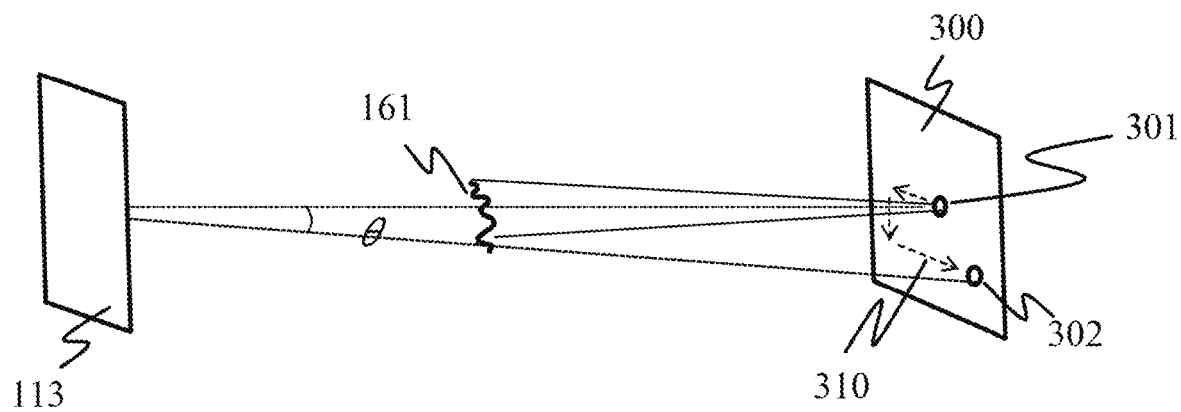
FIG. 7 illustrates scanning with illumination light according to the first embodiment.

After the process of S400, as illustrated in FIG. 7, the pulsed light having the wavefront 161 shaped in S300 is irradiated on target areas 301 and 302 on the object 300 while the irradiation angle is changed (while the object 300 is scanned) for late capturing. The target areas 301 and 302 on the object 300 correspond to the target areas in the captured image.

A scan amount 310 may be set by adding a linear phase shift amount according to the scan amount of the SLM 113 to the phase distribution obtained in S300 (phase modulation pattern of the SLM 113), for example. Alternatively, a scanning optical system may be separately provided for scanning. This scan is performed in a range in which the scanning correlation is maintained. Even when the irradiation area of the pulsed light in the object 300 (or the incident angle of the pulsed light) is changed, the wavefront shaping effect is maintained in S300 as long as the scattering has a correlation, and the imaging near the target area is available by using this effect. A scanning range may be set by using the expression (1), or by monitoring the objective function set in S200 based on the image capturing result while the irradiation angle is changed. For example, the objective function may be larger than the initial value of the process in S300.

As described above, when it is determined that the luminance value of the object image is reduced in the captured image as a result of scanning the object 300 with the pulsed light, the wavefront shaping process may be again performed. In this case, the wavefront shaping process may be again performed before the effect of the previous wavefront shaping process expires. In other words, while the luminance value of the object image is larger than that before the previous wavefront shaping process due to the previous wavefront shaping process, the measurement process from S100 to S400 that contains the wavefront shaping process in S300 may be again performed. Since the previous wavefront shaping process effect lasts, a captured image having a good SN can be more quickly obtained than that when a new wavefront shaping process is again performed from the beginning.

For example, the value of the objective function is monitored in the late capturing while the object is scanned with the pulsed light, and the wavefront shaping process is again performed as the monitored value is lower than the predetermined value, such as a half value, that depends on the value obtained in the previous wavefront shaping process. The illuminance value of part of the object 300 may be monitored. The wavefront of the initial value in the wavefront shaping process (optimization process) is set to a wavefront obtained in the previous wavefront shaping process. Thus, an image can be late captured with a high SN in a broader view angle range by repeating the scanning of the object 300 with the pulsed light and the wavefront shaping of the pulsed light. Finally, the captured image obtained by each wavefront shaping process may be connected and displayed on the display unit 140.

This embodiment describes imaging with a line of sight or monostatic configuration in which the gating imaging apparatus 100 in which the light source unit 110 and the camera unit 120 are integrated with each other and the object 300 are located on a straight line. On the other hand, as disclosed in Benjamin Gohler and Peter Lutzmann, "SWIR laser gated-viewing at Fraunhofer IOSB," Proc. of SPIE Vol. 9649 964902 (2015), the light source unit and the camera unit may be located separate positions or in a bi-static configuration for imaging in which the light source unit, the object, and the camera unit form a predetermined angled position relationship. This configuration also constitutes a gated imaging apparatus having the light source unit and the camera unit. The angle may be arbitrarily selected between 0 and 180°. The angle of 180° provides a transmission light measurement. The wavefront shaping process described in this embodiment is applicable to the transmission measurement arrangement. This embodiment is also applicable to an image capturing system that monitors an object 100 m to several tens kilometers distant.

This embodiment describes the optimization process that shapes the wavefront so as to maximize the value of the objective function, but may perform the optimization process for generating the wavefront so as to minimize the value according to the setting of the objective function.

Second Embodiment

Figure 8:
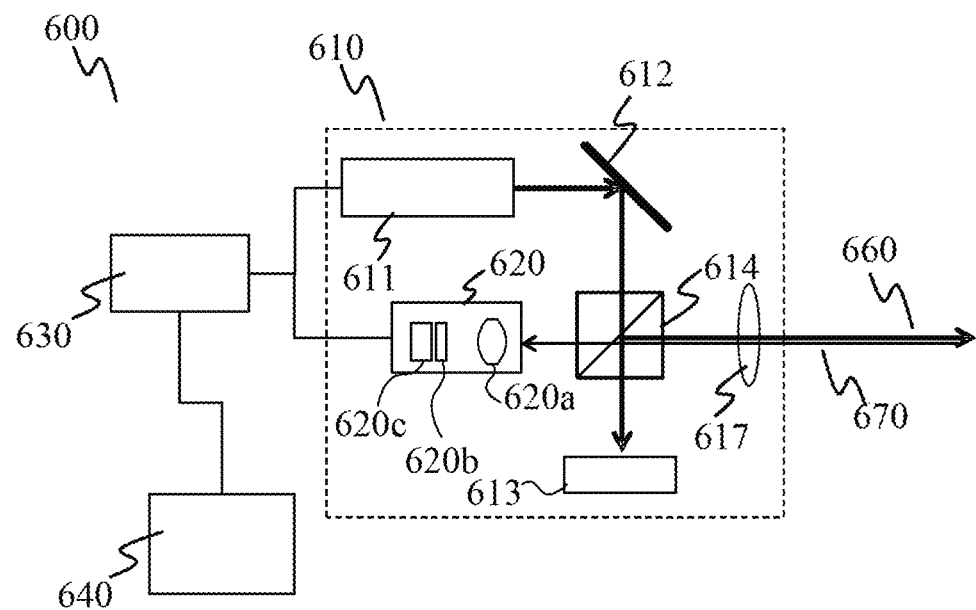
FIG. 8 illustrates a configuration of a gated imaging apparatus according to a first embodiment of the present invention.

FIG. 8 illustrates a configuration of a gated imaging apparatus according to a second embodiment of the present invention. A basic configuration is similar to that of the first embodiment illustrated in FIG. 1. A gated imaging apparatus 600 according to this embodiment includes a light source and image capturer (simply referred to as an "imaging unit" hereinafter) 610, a controller and processor (simply referred to as a "controller" hereinafter) 630, and a display unit 640. The imaging unit 610 contains an image capturer, and the controller 630 corresponds to the controller.

In the imaging unit 610, a laser light source 611 emits pulsed light of a visible to near infrared wavelength range, such as a wavelength from 400 nm to 1100 nm. The condition of the pulsed light other than the wavelength is similar to that in the first embodiment. The pulsed light collimated and emitted from the laser light source 611 is reflected on a mirror 612, transmits a beam splitter 614, and enters an SLM 613. Pulsed light 660 having a wavefront shaped by the SLM 613 is reflected on a beam splitter 614, and emitted from the imaging unit 610 through an optical system 617. The optical system 617 is designed for the visible to near infrared wavelength band.

Pulsed light (reflected object light) 670 emitted from the imaging unit 610, reflected on the unillustrated object, and returned to the imaging unit 610 transmits the optical system 617 and the beam splitter 614, and enters a camera 620. The pulsed light entering the camera 620 forms an image through a camera lens 620a, and reaches an array sensor 620b. An image generator 620c in the camera 620 generates a captured image (image data) based on an image signal output from the array sensor 620b that has photoelectrically converted the object image.

The controller 630 makes the camera 620 late capture an image when the reflected light reaches the array sensor (at a timing delayed by the delay time). The array sensor includes a CMOS sensor having a gate function. Alternatively, an array sensor in which a normal CCD or CMOS sensor may be combined with an image intensifier. In this case, the image intensifier controls the gate.

In this embodiment, the controller 630 basically provides a process similar to the measurement process and the wavefront shaping process illustrated in FIGS. 2 and 4 in the first embodiment. In other words, the controller 630 acquires an object observation signal in S100, and sets a target area in S200. This embodiment provides a process utilizing a transmission matrix instead of an optimization process in the wavefront shaping process in S300 by setting the objective function based on the luminance value of the target area. The transmission matrix t is defined as a linear input/output response represented by the following expression (3) where Ea is an electric field input to a scatterer, and Eb is an electric field output (or transmitted) from the scatterer.

$$Eb = tEa \tag{3}$$

The transmission matrix t can be obtained by measuring an output (wavefront of reflected light obtained by the late capturing) Eb for a variety of inputs (basis or the phase modulation patterns in the SLM 613) Ea in the expression (3). Similar to the first embodiment, the object through the scatterer can be imaged with a high SN by properly shaping the wavefront of the pulsed light 660 by utilizing the transmission matrix.

Figure 9:
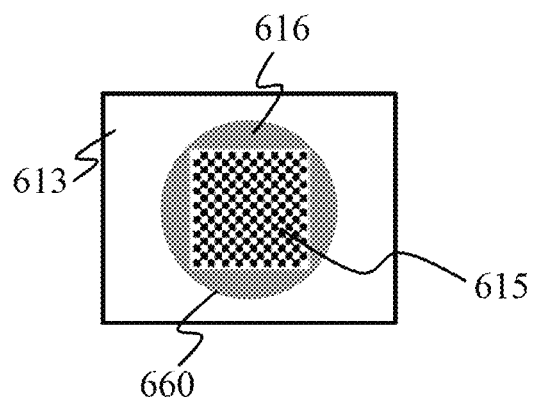
FIG. 9 illustrates a partial configuration in FIG. 8.

FIG. 9 illustrates an effective modulation area of the SLM 613. The controller 630 sets a phase modulation area 615 that provides a phase modulation represented by a checker design and a non-phase modulation area 616 that does not provide a phase modulation outside the phase modulation area 615 in the effective modulation area in the SLM 613. The controller 630 draws a basis pattern (Ea) in the phase modulation area 615, provides a phase shift method by giving a phase difference between the phase modulation area 615 and the non-phase modulation area 616, and measures the output Eb. In this case, an apparatus configuration can be made simpler because it is unnecessary to separately provide an optical path for reference light different from the pulsed light illuminated on the object.

The controller 630 generates the transmission matrix t by iterating the phase shift method the number of basis patterns N and by stacking the wavefront measured by the basis as a column vector on the matrix. In other words, the controller 630 makes the SLM 613 shape the wavefront by using a plurality of basis patterns, and generates the transmission matrix t based on the result of measuring the wavefront of the reflected light.

When the wavefront of the reflected light is measured through the array sensor having M pixels for N bases, M×N matrix t is obtained. At this time, a j-th column component in the transmission matrix t corresponds to the wavefront measured by the j-th basis. The basis pattern may use a basis pattern of a Hadamard basis, a random basis pattern, and a basis pattern generated by using a Zernike polynomial, etc.

The controller 630 generates (measures) the transmission matrix t, and then makes the SLM 613 shape the wavefront of the pulsed light 660 by using the transmission matrix t. This embodiment uses the target area set in S200. For example, the target area extracted by the binarization process illustrated in FIG. 3C is set to an amplitude distribution $E_{target}$ in the electric field reproduced by utilizing the transmission matrix t. The phase setting is arbitrary. The controller 630 calculates Ea as a modulation wavefront of the pulsed light 660 by using $E_{target}$ and the following expression (4).

$$Ea = t^{\dagger} E_{target} \quad (4)$$

† represents a transposed conjugate. The expression (4) calculates the modulated wavefront (Ea) based on a product between the vector ($E_{target}$) corresponding to the target area and the transposed conjugate t in the transmission matrix t. Ea in the expression (4) represents a phase conjugate wave of the wavefront in the reflected light from the object measured on the image capturing plane of the array sensor in the camera 620.

An additional basis conversion is necessary for Ea obtained in the expression (4) depending on the basis pattern used to generate the transmission matrix t. More specifically, the basis pattern illustrated in FIGS. 5B and 5C is different from the pattern for the segment area base illustrated in FIG. 5A and does not correspond to the coordinate in the SLM 613. Thus, the controller 630 provides a process that converts Ea calculated in the expression (4) into the basis corresponding to the coordinate in the SLM 613. This process may calculate a linear combination between the vector calculated in the expression (4) and the corresponding basis pattern. The image capturing plane on the camera 620 and the SLM 613 are adjusted so as to have equal optical paths to the object.

As described above, Ea (modulated wavefront) calculated in the expression (4) corresponds to a phase conjugate wave of the wavefront in the reflected light from the object. Hence, controlling the SLM 613 so as to irradiate the pulsed light having Ea on the object or to modulate the wavefront of the pulsed light irradiated on the object with the modulated wavefront enables the object to be imaged through the scatterer with a high SN similar to the first embodiment.

Moreover, a singular value decomposition of the obtained transmission matrix t enables a distribution of an eigen value in the transmission matrix t to be analyzed. The eigen value represents a transmittance (transmission eigen value) in an eigen space. Hence, the eigen vector having a small transmission eigen value has a small contribution to the signal intensity in this measurement. For example, the wavefront of the pulsed light 660 may be shaped only with the eigen vector as long as the entire transmittance of the transmission matrix t can be approximated by a sum of the transmission eigen values of some eigen vectors. Other eigen vectors are less likely to contribute to the signal intensity and thus ignorable.

The eigen value of the transmission matrix t may be analyzed, the statistic characteristic relating to the wavefront of the noise component caused by the scatters and fluctuations in the atmosphere may be estimated based on the distribution of the eigen value, and the type of the basis pattern, the spatial frequency range of the basis pattern, and the number of basis patterns may be set based on the statistic characteristic. The spatial frequency of the eigen vector that mainly contributes to the signal intensity may be analyzed, the upper limit of the frequency component or the frequency range of the scattered wavefront to be measured may be estimated, and the above basis pattern may be generated based on this estimation result. For example, the eigen vector may be analyzed as the premeasurement before the measurement process illustrated in FIG. 2, and the type of the basis pattern used to shape the wavefront, the spatial frequency range of the basis pattern, and the number of basis patterns N may be set. The premeasurement may measure the basis pattern of the high spatial frequency based on the relatively large number of basis patterns N. The measurements under a plurality of conditions may be made while the basis pattern is changed, and the basis pattern used for the wavefront shaping process may be determined.

After the premeasurement, the premeasurement analysis result may be used and the measurement process according to this embodiment may follow or the analysis result may be applied to the wavefront shaping in the optimization process described in the first embodiment. The scattered wavefront changes if a certain correlation time passes. On the other hand, the statistic characteristic of the scattered wavefront may be considered unchanged in a short time, such as the certain correlation time. Hence, the premeasurement analysis result can be utilized for a predetermined time period (for example, until the structure constant $C_n^2$ of the refractive index in the atmosphere significantly varies), such as while the measurement process illustrated in FIG. 2 is repeated.

This embodiment is applicable to an image capturing system that monitors an object located at a short distance, such as several meters and about 100 m, using a visible to near infrared band light.

The present invention is applicable to an image capturing apparatus having an area sensor that can provide a time of flight ("TOF") measurement in addition to the gated imaging apparatus. The area sensor that can provide the TOF measurement can image the pulsed light emitted from the light source unit through a time division for each TOF. For example, an avalanche photo diode ("APD") made of InGaAs can be used for the SWIR band. An APD sensor of a single device may be arranged on a two-dimensional plane.

An array sensor that can provide the TOF measurement in the frequency region may be used. For example, a lock-in CMOS sensor etc. that can provide a lock-in detection is applicable to the visible and near infrared bands. In this case, the irradiated beam may be intensity modulated light made by modulating the intensity with a sine wave of a certain frequency instead of the pulsed light. A phase difference between a modulated signal that modulates the light source and a modulated signal of modulated light that transmits through or is reflected on the object can provide the TOF measurement. The array sensor that can provide the TOF measurement can selectively image the light intensity distribution that reaches the image capturing apparatus with a certain delay time, similar to the gated imaging apparatus. Thus, the embodiment according to the present invention is applicable to an image capturing apparatus using an area sensor that can selectively measure a light intensity distribution with an arbitrary delay time.

As described above, each embodiment specifies a signal (object observation signal) corresponding to an object based on a captured image obtained through the late capturing, and shapes a wavefront of the light irradiated on the object so as to increase the signal intensity. Late capturing the reflected light (or transmitting light) from the object can image the object with a high SN through the scatterer.

The configuration of the image capturing apparatus, the optimization processing method used to shape the wavefront, and the transmission matrix generating method described in each embodiment are merely illustrative and another configuration and method can be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-079119, filed on Apr. 12, 2017 which is hereby incorporated by reference herein in its entirety.

What is claimed is:

1. An image capturing apparatus comprising:
a spatial light modulator configured to shape a wavefront of light traveling from a light source to an object;
an image capturer configured to generate image data by capturing an image of the object; and
a controller configured to control the spatial light modulator and to control the image capturer to capture the image of the object when object light via the object among the light reaches the image capturer,
wherein the controller sets a target area corresponding to the object in the image data by performing image processing for the image data and performs an optimization control of the spatial light modulator so as to maximize or minimize a value of an objective function set based on image data of the target area in the image data.

2. The image capturing apparatus according to claim 1, wherein the controller performs, as the image processing, at least one of a binarization process, an edge process, or a filtering process.

3. The image capturing apparatus according to claim 1, wherein the objective function is an average value or a sum of the image data of at least part of the target area.

4. The image capturing apparatus according to claim 1, wherein the objective function is a contrast value calculated from the image data of each of the target area and a non-target area in the image data.

5. The image capturing apparatus according to claim 1, wherein the controller controls the spatial light modulator so as to provide a phase modulation or an amplitude modulation of the light based on a basis pattern.

6. The image capturing apparatus according to claim 1, wherein the controller sets the objective function for each target area for two of a plurality of target areas which are distant from each other by a distance longer than a reference distance, and sets one object function for two of the plurality of target areas which are distant from each other by a distance shorter than the reference distance.

7. The image capturing apparatus according to claim 6, wherein the controller sets the reference distance based on a structure constant of a refractive index in an atmosphere.

8. The image capturing apparatus according to claim 1, wherein the controller controls the image capturer to capture the image by irradiating the light on the object while changing an illumination angle of the light.

9. The image capturing apparatus according to claim 1, wherein the controller monitors a value of the objective function while changing the illumination angle of the light, and again performs the optimization process when the value of the objective function becomes lower than a predetermined value.

10. An image capturing method comprising the steps of:
shaping through a spatial light modulator a wavefront of light traveling from a light source to an object;
generating through an image capturer image data by capturing an image of the object; and
controlling the spatial light modulator and controlling the image capturer to capture the image of the object when object light via the object among the light reaches the image capturer, wherein the controlling includes setting a target area corresponding to the object in the image data by performing image processing for the image data and performing an optimization control of the spatial light modulator so as to maximize or minimize a value of an objective function set based on image data of the target area in the image data.

11. A non-transitory computer-readable storage medium storing a program that enables a computer to execute an image capturing method comprising the steps of:

shaping through a spatial light modulator a wavefront of light traveling from a light source to an object;

generating through an image capturer image data by capturing an image of the object; and controlling the spatial light modulator and controlling the image capturer to capture the image of the object when object light via the object among the light reaches the image capturer, wherein the controlling includes setting a target area corresponding to the object in the image data by performing image processing for the image data and performing an optimization control of the spatial light modulator so as to maximize or minimize a value of an objective function set based on image data of the target area in the image data.

* * * * *